UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLACK SULFUR DYE.

SPECIFICATION forming part of Letters Patent No. 648,755, dated May 1, 1900.

Application filed February 6, 1900. Serial No. 4,264. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in Black Dyestuffs, of which the following is a specification.

My invention relates to the manufacture of a new deep-black dyestuff which dyes cotton without the aid of a mordant. This dyestuff is obtained by treating a certain meta-phenylendiamin derivative with sulfur and sodium sulfid. The said meta-phenylendiamin derivative results from the condensation in alcoholic solution of a molecule of symmetrical dinitro-meta-di-chlorbenzene and two molecules of para-amidophenol in the presence of a body that will bind hydrochloric acid, such as sodium carbonate or acetate. In this way dinitro-di-para-hydroxy-diphenyl-meta-phenylenediamin is obtained which, judging from its manner of formation, has the following constitutional formula:

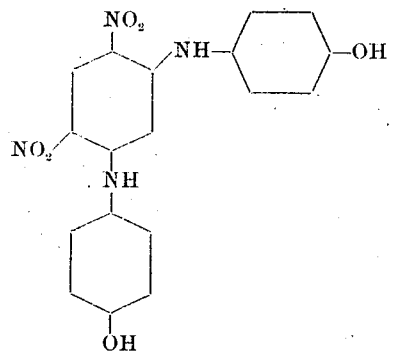

and this when treated in the manner to be described with sulfur and sodium sulfid yields the coloring-matter I desire to claim.

The following example will serve to further illustrate the manner in which my invention can be carried into practical effect and my new coloring-matter be obtained. The parts are by weight.

*Production of black coloring-matter from dinitro-di-para-hydroxy-diphenyl-meta-phenylendiamin.*—Prepare the required initial material by heating to boiling in a reflux apparatus a mixture of one (1) molecular proportion of dinitro-di-chlorbenzene with two (2) molecular proportions of para-amidophenol hydrochlorid dissolved in alcohol and sufficient sodium acetate to bind the hydrochloric acid formed during the reaction. Continue the heating until the dinitro-di-chlorbenzene has practically disappeared. Allow the liquid to cool and isolate the reaction product in any well-known manner. Mix together twenty (20) parts of the dinitro-di-para-hydroxy-diphenyl-meta-phenylendiamin thus obtained with forty (40) parts of sulfur, one hundred and twenty (120) parts of crystallized sodium sulfid, and five (5) parts of water in an iron vessel. Gradually heat the mixture to about 140° centigrade while stirring and maintain at this temperature until the melt has become quite dry. Powder up the melt when cool. In this condition it can be directly used for dyeing purposes, or it may be dissolved in a little water and the coloring-matter salted out with common salt. In this case it is necessary in addition to soda and common salt to add sodium sulfid to the dyeing-bath in order to obtain the best results.

My new coloring-matter is readily soluble in water, its aqueous solution being deep blue. Acids added to this solution produce a brown precipitate which is redissolved by alkalies with a blue color. It dyes unmordanted cotton a deep black which is exceedingly fast to soap, light, and acids. It is but little altered in fastness or shade by subsequent treatment with chromates, copper salts, and the like.

Now what I claim is—

The new coloring-matter which can be obtained from dinitro-di-para-hydroxy-diphenyl-meta-phenylendiamin sulfur and sodium sulfid, whose solution in water is of a deep-blue color, dyeing unmordanted cotton a deep black, which is not materially altered in shade or fastness by treatment with chromates and copper salts, and in which solution a brown precipitate is formed on the addition of hydrochloric acid, said precipitate dissolving in alkalies with a deep-blue color substantially as described.

In testimony whereof I have hereunto set my hand in the presence of two subscribing witnesses.

PAUL JULIUS.

Witnesses:
JACOB ADRIAN,
ERNEST F. EHRHARDT.